United States Patent [19]
Verbakel et al.

[11] Patent Number: 5,197,917
[45] Date of Patent: Mar. 30, 1993

[54] APPARATUS FOR REMOVING SKIN FROM ANIMAL PARTS

[75] Inventors: Godefridus W. Verbakel; Thomas G. Jacobs, both of Gainesville; Robert J. Conklin, Buford; Raymond F. Strawn, Flowery Beach, all of Ga.

[73] Assignee: Stork Gamco, Inc., Gainsville, Ga.

[21] Appl. No.: 776,596

[22] Filed: Oct. 11, 1991

[51] Int. Cl.$^5$ .............................................. A22B 5/16
[52] U.S. Cl. .................................. 452/131; 452/130; 452/127
[58] Field of Search ............... 452/130, 131, 132, 133, 452/138, 125, 127

[56] References Cited
U.S. PATENT DOCUMENTS

| | | | |
|---|---|---|---|
| 2,881,469 | 4/1959 | Moss | 452/130 |
| 3,729,775 | 5/1973 | McDonald | 452/130 |
| 3,930,283 | 1/1976 | Martin | 452/130 |
| 4,183,117 | 1/1980 | Meyn | 452/114 |
| 4,610,051 | 9/1986 | Martin | 452/130 |

Primary Examiner—Willis Little
Attorney, Agent, or Firm—Todd Deveau; Larry Colton; Arthur A. Gardner

[57] ABSTRACT

An apparatus for removing the skin from animal parts, such as from poultry thighs, comprises a rotary turntable for supporting the poultry thighs and for conveying them along a path in a forward direction and a pair of counter-rotating peeler rollers positioned beneath the turntable. The rotary turntable has an aperture formed therein and a vacuum means positioned adjacent the rollers for drawing a portion of the skin of the poultry part through the aperture and toward the rollers to reliably engage the skin of the poultry part in the peeler rollers.

26 Claims, 2 Drawing Sheets

APPARATUS FOR REMOVING SKIN FROM ANIMAL PARTS

TECHNICAL FIELD

The present invention relates generally to animal slaughtering and more particularly to an apparatus for removing the skin from animal parts, such as poultry parts.

BACKGROUND OF THE INVENTION

Much poultry is sold in the form of deskinned poultry parts. In removing the skin during processing, it is important to avoid damaging the meat, particularly since with the skin removed, the meat is readily visible and therefore should be maintained in an undamaged condition. Automatic equipment has been developed to remove skin from poultry parts to replace the traditional method of manual removal of the skin. Known prior devices are less than completely effective for removing the skin without damaging the meat, for reliably engaging the skin to remove the skin without fail, and for reclaiming the skin from the removal equipment.

U.S. Pat. No. 4,459,721 of Hill is such a device and relates to a poultry skinning machine for removing the skin from poultry parts. Hill discloses a pair of helical rollers having inter-engaging helical teeth that laterally transport the poultry part while removing the skin from the part. Hill teaches that an operator would place the poultry part onto the pair of rollers whereby the skin is removed from the meat as the poultry part is supported and carried along in a longitudinal direction by the helical rollers. This type of device is generally developed from earlier devices for separating the gut and stomach from poultry gizzards utilizing peeling rollers. A disadvantage of this arrangement in connection with larger poultry pieces, such as thighs, drumsticks, breasts, etc., is that the meat on these larger pieces is much less firm than the rather tough gizzard, and can easily be drawn into and damaged by the rollers.

European Patent Application No. EP 0 244 887 B1 relates to a breast skinner in which a poultry carcass is suspended by the legs and dragged across two pairs of pinch rollers in a manner to cause the breast portion to traverse the two pairs of rollers perpendicular to the elongation of the rollers. Two different size pairs of rollers are used so that the breast skin is more reliably grasped and removed for different size carcasses. While this system generally works well for breast portions still attached to the poultry carcass, it is not particularly well-suited to removing the skin from other poultry parts already detached from the remainder of the carcass, such as detached legs and thighs.

Accordingly, it can be seen that a need yet remains for an apparatus for removing the skin from animal parts which is reliable in operation, is effective without damaging the meat of the poultry part, is well-suited for use with detached parts, and which is safe in use. It is to the provision of such an apparatus that the present invention is primarily directed.

SUMMARY OF THE INVENTION

In a preferred form, the present invention comprises an apparatus for removing the skin from animal parts, such as from poultry thighs, legs, breasts, etc. The apparatus includes a pair of counter-rotating rollers and a vacuum means positioned adjacent the rollers for drawing a portion of the skin of the animal parts toward the rollers.

In another preferred form the invention comprises an apparatus for removing the skin from animal parts and includes a pair of counter-rotating rollers and a transport means for supporting the animal parts and for conveying them along a path in a forward direction to and adjacent the rollers. The transport means defines an aperture therethrough against which the animal parts can be placed for allowing a portion of the skin of the animal parts to extend through the aperture for causing the skin to engage the rollers.

Preferably, vacuum means and an aperture defined in a transport means are combined in a single embodiment wherein the vacuum means draws the skin partially through the aperture for reliably engaging the skin in the rollers.

With this construction, an animal part, such as a whole poultry thigh, can be Placed on the upper surface of the transport means over the aperture. As the transport means moves in the forward direction and the aperture moves near the vacuum means, vacuum pulls on that portion of the skin of the poultry thigh which is exposed through the aperture. This causes the skin to be drawn through the aperture somewhat. As the transport means continues to move in the forward direction, the skin extending through the aperture is engaged by the counter-rotating rollers which grab the skin and pull it from the meat. The vacuum also helps to remove the skin from the rollers after the skin has been completely removed from the meat.

This construction has several advantages. For example, in loading the poultry parts on the transport means, the operator is not endangered by potentially contacting the rollers, since the loading takes place away from the rollers and since the operator merely works to cover an aperture with a poultry part. Also, the vacuum tends to ensure reliable engagement of the skin with the rollers. Furthermore, the transport means holds the meat a selected small distance away from the rollers to minimize the likelihood of any damage to the meat from the counter-rotating rollers. In this regard, with the aperture being smaller than the meat, the transport means tends to hold the meat away from the rollers to prevent damage to the meat. This design takes advantage of the fact that the skin is able to sag or stretch somewhat from the meat.

Accordingly, it is a primary object of the present invention to provide an apparatus for removing the skin from animal parts, particularly poultry parts, which is safe in operation.

It is another object of the present invention to provide an apparatus for removing the skin from poultry parts, particularly poultry parts, which is effective and reliable in operation.

It is another object of the present invention to provide an apparatus for removing the skin from animal parts which is effective at removing the skin from detached poultry parts without damaging the meat of the poultry parts.

It is another object of the present invention to provide an apparatus for removing the skin from animal parts which is simple in design and economical in manufacture.

It is yet another object of the present invention to provide an apparatus which is well-suited for removing the skin of detached poultry parts.

BRIEF DESCRIPTION OF THE DRAWING FIGURES

DETAILED DESCRIPTION

Figure 1:
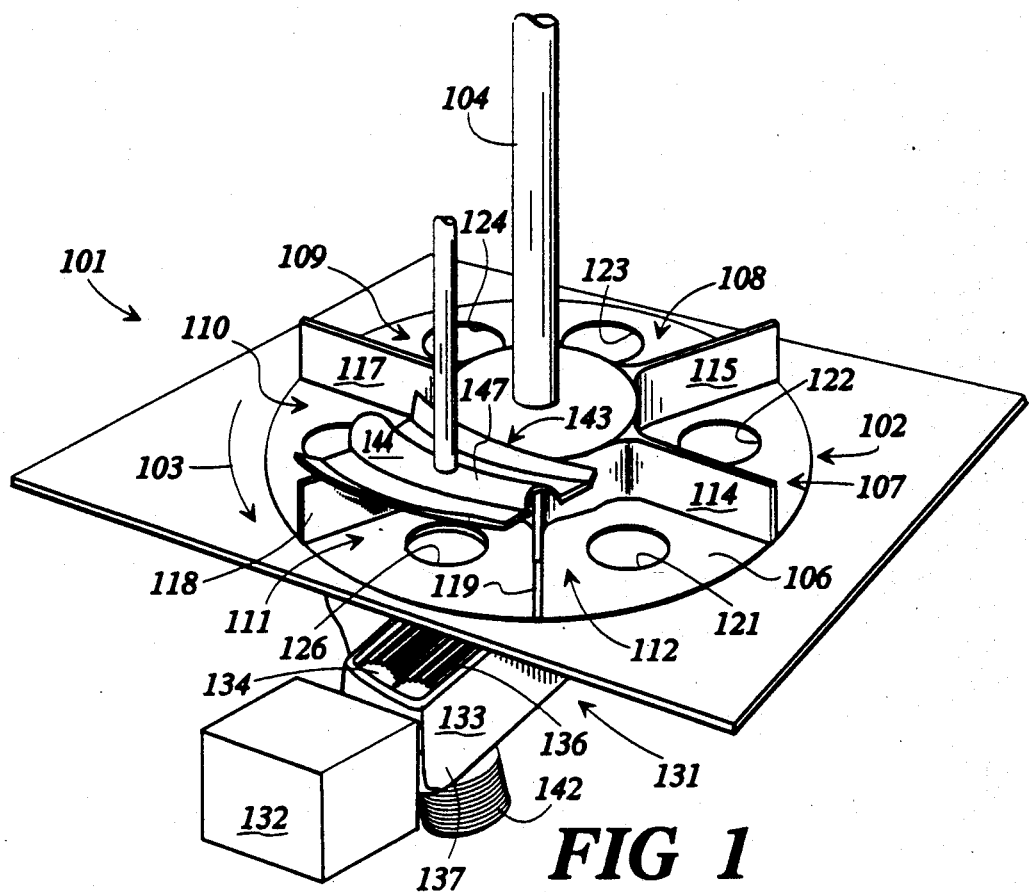
FIG. 1 is a perspective, schematic illustration of an apparatus for removing skin in a preferred form of the present invention.

Referring now in detail to the drawing figures, wherein like reference numerals designate like parts throughout the several views, FIG. 1 shows an apparatus 101 for removing skin from animal parts, particularly poultry parts. The present invention has application to poultry meats, red meats, and other meats. However, for purposes of illustrating the principles of the present invention, a specific example is disclosed herein in the form of an apparatus for removing skin from poultry parts, such as poultry thighs. This is what is shown in FIGS. 1-4.

Figure 2:
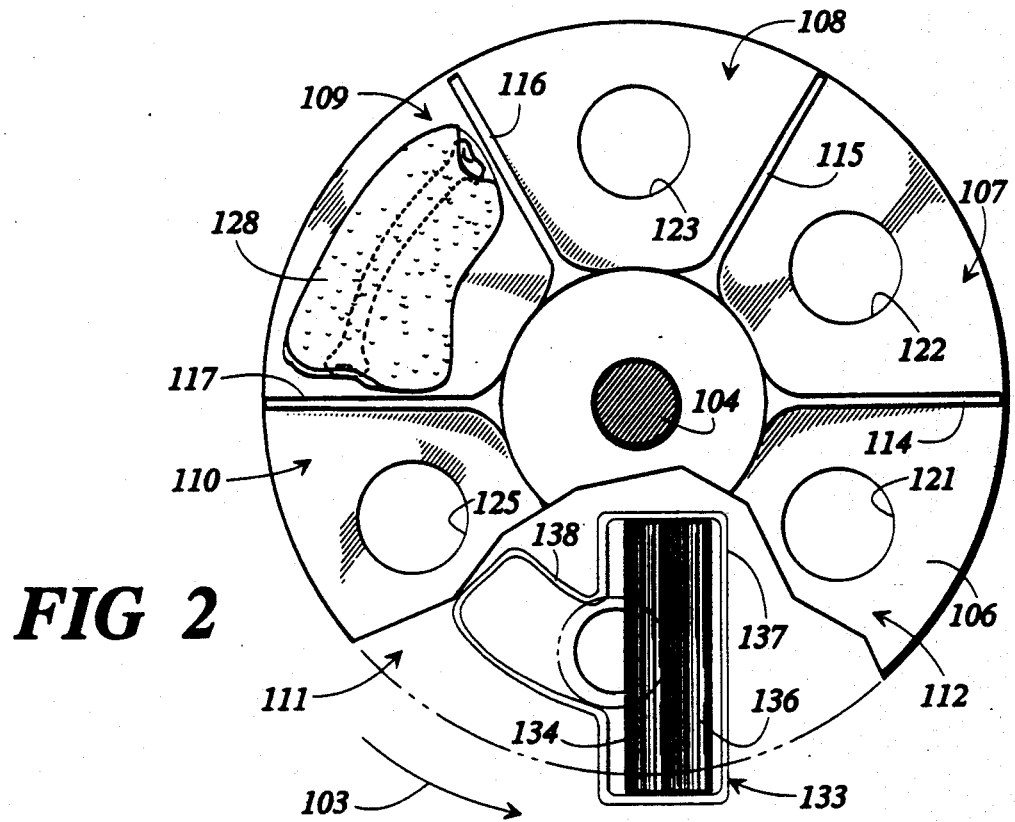
FIG. 2 is a partially cut away, plan view of a portion of the apparatus of claim 1.
Figure 3:
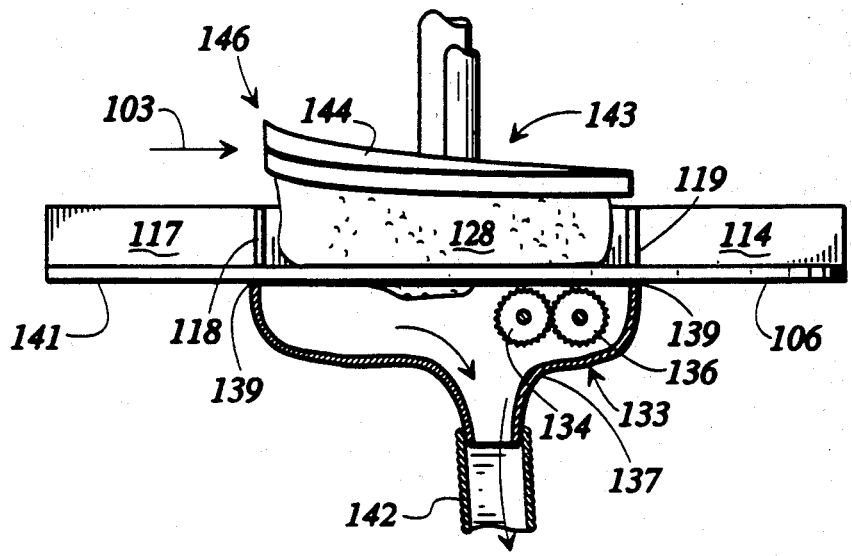
FIG. 3 is a schematic, sectional view of the apparatus of FIG. 1.
Figure 4:
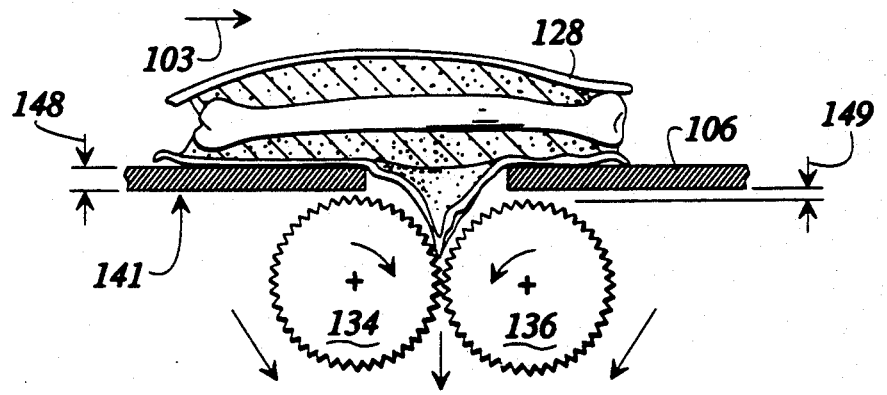
FIG. 4 is a schematic, sectional view of a portion of the apparatus of FIG. 1.

Apparatus 101 includes a turntable 102 driven in rotation in the direction of direction arrow 103 by driveshaft 104 and by an unshown motor means. As shown in FIGS. 1-3, the turntable 102 includes a generally disk-shaped platform portion 106 which is divided up into six equal poultry part receiving chambers 107-112. The poultry part receiving chambers 107-112 are separated from one another by ribs 114-119 which extend radially and axially. Apertures or openings 121-126 are formed in the platform 106 in the chambers 107-112. The diameter of the apertures 121-126 should be selected to permit ready access to the skin of a poultry part, such as poultry part 128 of FIG. 2, while preventing the poultry part from passing therethrough. Applicant has found that for poultry thighs, apertures having a diameter of about 1.5 inches work well and it appears that apertures of between 1-2 inches would work well also.

A peeler assembly 131 is positioned beneath the rotary turntable 102. The peeler assembly 131 includes a housing 132 containing an unshown motor and gear assembly. The housing 132 and its internal contents are mounted adjacent a vacuum housing 133. The vacuum housing 133 houses a pair of counter-rotating, elongate, spur-gear rollers 134 and 136. It is possible to replace the spur-gear type rollers with helical gear rollers. However, spur-gear rollers are preferred because the helical rollers tend to transport the skin laterally along the length of the rollers faster than the skin is peeled from the meat. This causes some difficulties in ensuring that all of the skin is peeled from the meat reliably.

In the figures, the rollers 134 and 136 are positioned perpendicularly to the direction of movement of the apertures 121-126 of the turntable 102 as the turntable rotates in direction 103. The vacuum housing 133 has a generally rectangular, trailing section 137 positioned about the rollers 134 and 136 and a leading or forward section 138. The leading section 138 is generally elongated and arcuate and is positioned on a radius coextensive with that of the apertures 121-126 so that as the turntable 102 rotates in the direction of direction arrow 103, the apertures one by one communicate with the leading section 138 and continue to communicate with the leading section until the apertures reach the trailing section 137. The vacuum housing 133 bears a rubber seal 139 sealing an upper edge portion of the vacuum housing 133 to an underside surface 141 of the platform 106. A suitable hose 142 connects the vacuum housing 133 with an unshown source of vacuum (reduced air pressure).

The rollers 134 and 136 have a diameter of roughly 27 millimeters. However, other size rollers might work suitably well. The rollers are driven in rotation at a speed sufficient to ensure that the surface speed of the rollers is greater than the speed of a poultry part 128 as it passes over the rollers 134 and 136 as the poultry part is carried along in the direction of direction arrow 103 by the turntable 102. This greater speed of the rollers helps to ensure that the rollers will tend to pull the skin from the meat.

A pressure plate 143 is positioned above the platform 106 generally opposite the vacuum housing 103. The pressure plate 143 includes a foot 144 which is adapted to engage one side of the poultry part 128 as the poultry part passes thereunder and has a raised leading end 146 for easing entry of the poultry part thereunder. The pressure plate tends to help push the meat into the aperture. Also, the pressure plate 143 defines an elongate, central recess 147 for maintaining alignment of a bone portion of the poultry part in a desired orientation, for example, in alignment with the direction of movement of the poultry part. This can be important, for example, when the apparatus 101 is combined with auxiliary equipment, such as a device for removing the bone from the skinned meat. In that instance, it can be very important to off-load the meat and bone from the skinning apparatus in a preferred orientation to ensure reliable functioning of the deboning apparatus.

The platform 106 should have a thickness 148 which is great enough to effectively support the meat of the poultry part 128 above the rollers 134 and 136 as the poultry part passes thereover. Applicant has found that a thickness of between 2-3 millimeters works well, particularly in conjunction with a spacing 149 of between 1-2 millimeters between the underside surface 141 of the platform 106 and an upper portion of the rollers 134 and 136. This arrangement supports the meat some 3-5 millimeters above the rollers 134 and 136 and tends to prevent the meat from becoming engaged in the rollers and damaged thereby.

OPERATION

With this construction, a poultry part, such as a whole poultry thigh, can be placed on the upper surface of the platform over one of the apertures at a position well displaced from the rollers. This Provides improved safety. Gravity acts on the meat and skin of the poultry part and tends to allow the skin to sag somewhat, thereby extending the skin slightly into the aperture. As the turntable rotates, the aperture becomes exposed to the leading section 138 of the vacuum housing. Thus, the skin of the poultry part in the aperture is exposed to reduced pressure and is drawn partially through the aperture so that some of the skin extends down below the level of the underside surface 141 of the platform 106. See FIG. 3. As the platform continues to move in the forward direction, the skin engages the first roller 134 and is carried into the nip between the two rollers, thereby peeling the skin from the meat.

As the meat is peeled from the skin, the peeling action tends to try to move the meat about on the upper surface of the platform 106. This is so because the skin is more loosely attached to the meat in some locations and more firmly attached to the meat in other locations. The rotation or other movement of the meat relative to the upper surface of the platform is resisted by the pressure plate having the longitudinal recess.

The vacuum also helps to remove the skin from the rollers after the skin has been completely removed from the meat. This has several advantages. For example, by removing the skin from the rollers quickly, the integrity of the skin is maintained, allowing the skin to be better suited for subsequent use and processing. Also, in those instances where a water spray is used to keep the parts of the apparatus clean, quickly removing the skin from the rollers tends to prevent emulsification of the fat in the water, thereby minimizing waster water treatment requirements.

The above construction and operation has many advantages. For example, in loading the poultry parts on the rotary turntable away from the rollers, the operator is not endangered by potentially contacting the rollers. Also, the vacuum tends to ensure reliable engagement of the skin with the rollers and tends to clean the skin from the rollers. Furthermore, the rotary turntable holds the meat a selected small distance from the rollers to minimize the likelihood of any damage to the meat from the counter-rotating rollers, thereby increasing yield. This design is well-suited for removing the skin of detached poultry parts and is reliable and safe in operation.

The vacuum seal maintained between the underside of the rotary turntable and the vacuum housing need not be perfect. Rather, only a rough vacuum seal or, in the alternative, a high air flow is required. Of course, improved sealing efficiency decreases the energy consumption of the apparatus and the noise associated with its operation. The vacuum also tends to decrease the criticality of the spacing between the bottom of the poultry part and the top of the rollers.

While the invention has been shown in a preferred form, it will be obvious to those skilled in the art that many modifications, additions, and deletions may be made therein. For example, it is possible to do away with the pressure plate arrangement if the apparatus is to be used as a stand-alone device and therefore there would be no need for aligning the bone of the meat with a subsequent apparatus. Also, while the transport means (e.g., the rotary turntable) is disclosed herein in rotary fashion, it is possible to arrange the apparatus so that the poultry part is carried along a linear path. In that instance, the vacuum housing would be modified accordingly. Moreover, the transport means need not be incorporated in the device, but can instead comprise an existing overhead conveyor line. In fact, transport means can be done away with where the animal part is placed manually directly over the rollers. Also, the leading section of the vacuum housing could be eliminated altogether. Furthermore, while the poultry part is carried in a horizontal orientation in the apparatus shown herein, it is possible to carry the poultry part in a vertical orientation and to place the rollers and vacuum housing beside the poultry part instead of below it. It is possible also to provide rollers which are generally aligned with the path of travel and which are not parallel to each other, but rather are oriented at an angle with respect to each other. These and other modifications do not depart from the spirit and scope of the invention as set forth in the following claims.

I claim:

1. An apparatus for removing the skin from animal parts, such as poultry thighs, comprises:
    a pair of counter-rotating rollers; and
    vacuum means positioned adjacent said rollers for drawing a portion of the skin of the animal parts toward said rollers.

2. An apparatus as claimed in claim 1 further comprising transport means for supporting the animal parts and conveying them along a path in a forward direction, said rollers being positioned to one side of and adjacent said path.

3. An apparatus as claimed in claim 2 wherein said transport means comprises a platform spaced a small distance from said rollers.

4. An apparatus as claimed in claim 3 wherein said platform defines an aperture therethrough against which the animal parts are to be placed.

5. An apparatus as claimed in claim 2 wherein said rollers rotate about axes which are generally transverse to said forward direction.

6. An apparatus as claimed in claim 2 wherein said transport means comprises a platform adapted for rotary movement past said rollers, said aperture being formed in said platform.

7. An apparatus as claimed in claim 4 wherein said aperture is between about one inch and two inches across.

8. An apparatus as claimed in claim 1 wherein said vacuum means comprises a housing extending about said rollers and adapted to be connected to a source of vacuum.

9. An apparatus as claimed in claim 2 wherein said vacuum means comprises a vacuum housing including a leading portion spaced from said rollers and adapted for drawing a portion of the skin away from said path before the animal part reaches said rollers.

10. An apparatus as claimed in claim 2 wherein said vacuum means comprises means for drawing a portion of the skin away from said path before the animal part reaches said rollers.

11. An apparatus as claimed in claim 4 further comprising biasing means positioned to a side of said transport means opposite said one side for urging the animal part against said transport means and partially within said aperture.

12. An apparatus as claimed in claim 11 wherein said biasing means comprises a pressure plate defining a longitudinal channel therein for receiving an animal part and adapted for maintaining an elongate bone of the animal part in general alignment with said forward direction.

13. An apparatus as claimed in claim 1 wherein said apparatus is adapted for removing skin from poultry parts.

14. An apparatus as claimed in claim 2 wherein said transport means is adapted for supporting the animal parts in a generally horizontal orientation.

15. An apparatus for removing the skin from animal parts comprises:
    a frame;
    a pair of counter-rotating rollers mounted to said frame;

transport means for supporting the animal parts and for conveying the animal parts along a path in a forward direction to and adjacent said rollers, said transport means defining an aperture therethrough against which the animal parts can be placed for allowing a portion of the skin to extend through said aperture for causing the skin to engage said rollers.

16. An apparatus as claimed in claim 15 wherein said transport means comprises a platform having a surface for engaging animal parts, said surface being spaced a small distance from said rollers.

17. An apparatus as claimed in claim 15 wherein said small distance is less than about 0.15 inches.

18. An apparatus as claimed in claim 15 wherein said rollers rotate about axes which are generally transverse to said forward direction.

19. An apparatus as claimed in claim 15 wherein said transport means comprises a platform adapted for rotary movement past said rollers, said aperture being formed in said platform.

20. An apparatus as claimed in claim 15 wherein said aperture is between about one inch and three inches across.

21. An apparatus as claimed in claim 15 further comprising a vacuum means for drawing the animal parts toward said rollers.

22. An apparatus as claimed in claim 21 wherein said vacuum means comprises a housing at least Partially sealed to an underside of said transport means, said housing being positioned about said rollers adjacent said transport means and adapted to be connected to a source of reduced pressure.

23. An apparatus as claimed in claim 15 further comprising biasing means positioned to one side of said transport means for urging the animal part against said transport means and partially within said aperture.

24. An apparatus as claimed in claim 23 wherein said biasing means comprises a pressure plate defining a longitudinal channel therein for receiving an animal part and adapted for maintaining an elongate bone of the animal part in general alignment with said forward direction.

25. An apparatus as claimed in claim 15 wherein said apparatus is adapted for removing skin from poultry parts.

26. An apparatus as claimed in claim 15 wherein said transport means is adapted for supporting the animal parts in a generally horizontal orientation.

* * * * *